US007613889B2

(12) United States Patent
Stakutis et al.

(10) Patent No.: US 7,613,889 B2
(45) Date of Patent: Nov. 3, 2009

(54) SYSTEM, METHOD, AND PROGRAM FOR DETERMINING IF WRITE DATA OVERLAPS SOURCE DATA WITHIN A DATA MIGRATION SCHEME

(75) Inventors: Christopher John Stakutis, Concord, MA (US); William Robert Haselton, Peabody, MA (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 10/865,625

(22) Filed: Jun. 10, 2004

(65) Prior Publication Data

US 2005/0278492 A1  Dec. 15, 2005

(51) Int. Cl.
*G06F 12/00* (2006.01)
(52) U.S. Cl. .................. 711/162; 711/161; 711/165; 707/204
(58) Field of Classification Search ................. 711/161, 711/162, 165; 707/204
See application file for complete search history.

(56) References Cited

U.S. PATENT DOCUMENTS

| | | | | |
|---|---|---|---|---|
| 5,226,159 | A | * | 7/1993 | Henson et al. .................. 707/8 |
| 5,680,640 | A | * | 10/1997 | Ofek et al. ..................... 710/19 |
| 5,701,437 | A | * | 12/1997 | Kinjo et al. .................. 711/162 |
| 5,727,203 | A | * | 3/1998 | Hapner et al. ........... 707/103 R |
| 5,742,792 | A | * | 4/1998 | Yanai et al. .................. 711/162 |
| 5,822,780 | A | | 10/1998 | Schutzman |
| 5,933,653 | A | * | 8/1999 | Ofek .............................. 710/6 |
| 5,956,712 | A | * | 9/1999 | Bennett et al. .................. 707/8 |
| 6,145,066 | A | | 11/2000 | Atkin |
| 6,253,300 | B1 | | 6/2001 | Lawrence et al. |
| 6,260,124 | B1 | | 7/2001 | Crockett et al. |
| 6,496,908 | B1 | * | 12/2002 | Kamvysselis et al. ....... 711/162 |
| 6,546,457 | B1 | | 4/2003 | Don et al. |
| 6,640,291 | B2 | | 10/2003 | Fujibayashi et al. |
| 6,647,474 | B2 | | 11/2003 | Yanai et al. |

(Continued)

FOREIGN PATENT DOCUMENTS

EP  0 566 966 A  10/1993

(Continued)

OTHER PUBLICATIONS

Altmeyer, Oliver, "User space vs. kernel space", Dec. 9, 2002, accessed at http://krypt1.cs.uni-sb.de/projects/sekero/docu/node17.html on Aug. 30, 2006.*

(Continued)

*Primary Examiner*—Stephen C Elmore
*Assistant Examiner*—Arpan Savla
(74) *Attorney, Agent, or Firm*—David W. Victor; Konrad Raynes and Victor LLP (57) ABSTRACT

Provided are a method, system, and program for migrating source data to target data. A write request is received to write application data to source data not yet migrated to the target data. Information is generated for the write request indicating the source data to which the application data is written. The application data is written to the source data. A request is received to migrate source data to target data and indication is returned to retry the request to migrate in response to determining that the requested source data to migrate overlaps source data indicated in the generated information for one write request.

33 Claims, 5 Drawing Sheets

U.S. PATENT DOCUMENTS

| | | |
|---|---|---|
| 6,665,783 B2 | 12/2003 | Zahir |
| 6,745,285 B2 * | 6/2004 | Howard et al. ............... 711/114 |
| 6,799,258 B1 * | 9/2004 | Linde ......................... 711/162 |
| 6,973,549 B1 * | 12/2005 | Testardi ...................... 711/150 |
| 7,353,351 B1 * | 4/2008 | Haase et al. ................. 711/162 |
| 7,421,537 B2 * | 9/2008 | Corrado ...................... 711/114 |
| 2004/0024961 A1 | 2/2004 | Cochran et al. |
| 2004/0080558 A1 | 4/2004 | Blumenau et al. |
| 2005/0138308 A1 * | 6/2005 | Morishita et al. ........... 711/162 |
| 2005/0198450 A1 * | 9/2005 | Corrado et al. .............. 711/162 |

FOREIGN PATENT DOCUMENTS

| | | |
|---|---|---|
| GB | 2 351 375 A | 12/2000 |

OTHER PUBLICATIONS

International Search Report and Written Opinion, for application No. PCT/EP2005/052097, filed Oct. 5, 2005.

EPO Examination Report dated Apr. 17, 2007 for Application No. 05 740 105.1-2201.

* cited by examiner

Intervening Write List Entry

FIG. 5

Read Buffer

SYSTEM, METHOD, AND PROGRAM FOR DETERMINING IF WRITE DATA OVERLAPS SOURCE DATA WITHIN A DATA MIGRATION SCHEME

BACKGROUND OF THE INVENTION

1. Field of the Invention

The present invention relates to a method, system, and program for migrating source data to target data.

2. Description of the Related Art

A storage element, such as a database file, directory or any grouping of data, may be migrated from a source storage location to a target storage location in order to establish and maintain a mirror copy of data or to transfer the data to a new location at the target location from where the data will be accessed after migration. Many large scale data transfers, such as the transfer of an on-line or business database system, may take a substantial amount of time to migrate over a network. Moreover, during the migration, the system may need to permit transactions to continue.

Various hardware and software solutions provide mechanisms to transfer updates to both the source and target locations while the data is being migrated. A migration operation typically involves a read request to the source data and then issuance of a write request to the target. Migration systems must address a potential conflict that can occur when a write request to source data from an application is initiated while the source data is being migrated to the target data. For instance, if new source data is received while the old source data is being written, then the new source data may not be migrated to the target location.

One known solution to this potential conflict is to serialize access to the source data until the write of application data or migration completes, so that any intervening application write and migration operations are not allowed to occur until the pending write or migration completes. This delays returning complete to the request waiting for the lock to be released by the current write or migration operation. Thus, serialization prevents writes to the source data from being executed while data is being migrated until the source data has completed writing to the target data. Further, if an update is occurring to a block, then a migration operation to that same block is delayed until the update completes. Delays related to serialization can slow the performance of both the write operation to the source data and the migration of the source data to the target data.

SUMMARY

Provided are a method, system, and program for migrating source data to target data. A write request is received to write application data to source data not yet migrated to the target data. Information is generated for the write request indicating the source data to which the application data is written. The application data is written to the source data. A request is received to migrate source data to target data and indication is returned to retry the request to migrate in response to determining that the requested source data to migrate overlaps source data indicated in the generated information for one write request.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
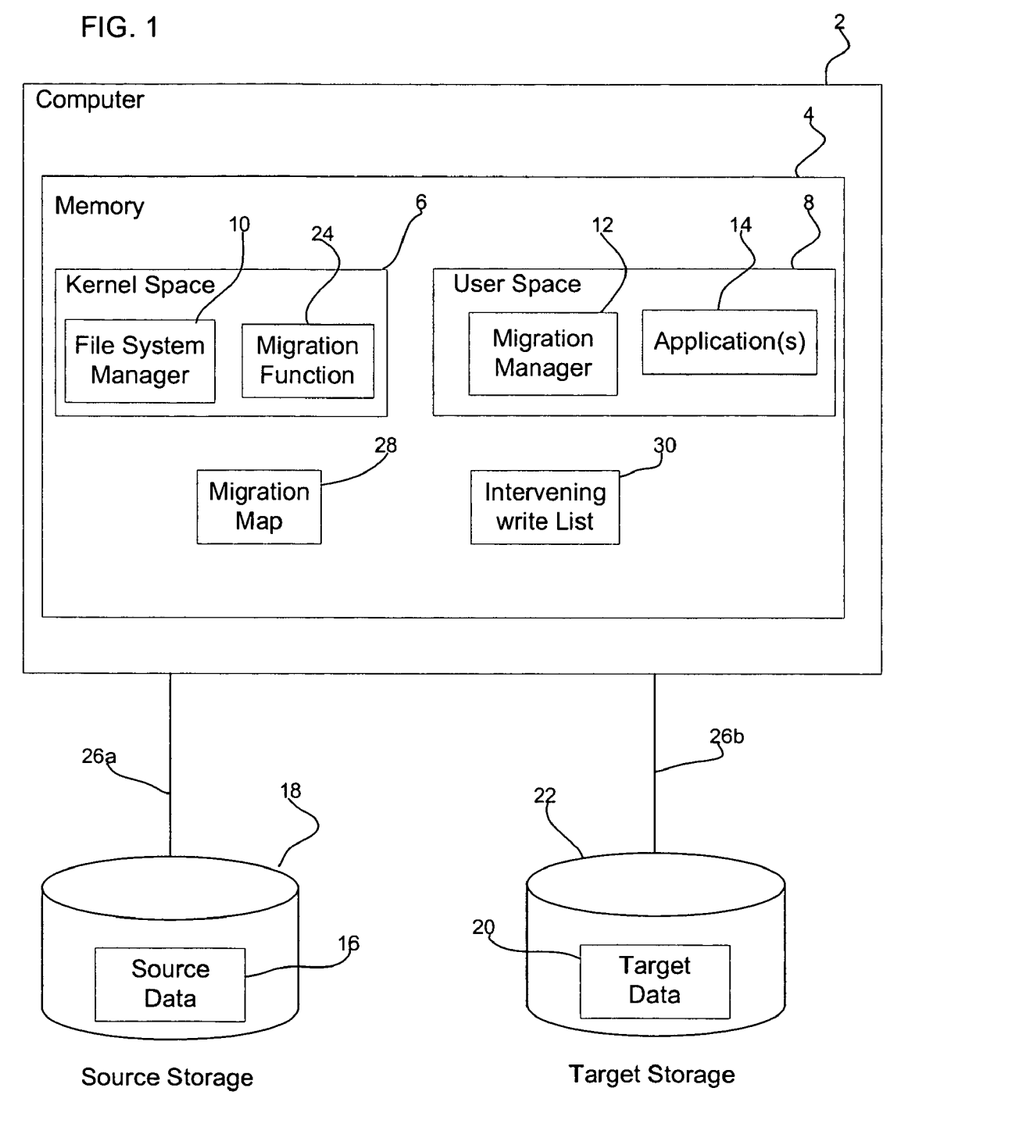
FIG. 1 illustrates a computing environment in which embodiments are implemented.

FIG. 1 illustrates a computing system 2 including a memory 4. Processes and threads in the computer 2 execute in a kernel address space 6 or user address space 8, where processes executing in the kernel address space 8 may execute at a higher priority than those in the user address space 8. A file system manager 10 executes in the kernel address space 6 to process read and write requests issued by the migration manager 12 and applications 14 executing in the user address space 8. The migration manager 12 initiates operations to migrate blocks in the source data 16 from the source storage 18 to blocks in the target data 20 in the target storage 22. The file system manager 10 executes a migration function 24 to perform the migration operations of the data specified by the migration manager 12 in the command invoking a migration operation.

The source 18 and target 22 storages may be implemented in a same storage device or system or in separate storage devices or systems. The source 18 and target 22 storages may comprise any storage device known in the art, such one storage device or multiple interconnected devices, such as disk drives, configured as a Redundant Array of Independent Disks (RAID), Just a Bunch of Disks (JBOD), Direct Access Storage Device (DASD), a tape storage device, a single or multiple storage units, e.g., a tape library, etc. The computer 2 connects to the source storage 18 and target storage 22 via connections 26a and 26b. The connections 26a and 26b may comprise any interface between storage and a host known in the art, such as a network connection (e.g., Ethernet, wireless, Fibre Channel, etc.) or any other data transfer interface known in the art, e.g., Advanced Technology Attachment (ATA), Serial ATA (SATA), Small Computer System Interface (SCSI), etc., which may be external or internal to the host 2 enclosure.

A migration map 28 provides information on how data units in the source data 16 correspond to units in the target data 20, such that source data units are transferred to the corresponding target data units indicated in the migration map 28. The migration manager 12 uses the migration map 28 to determine the target data unit that will receive the source data unit being migrated. The source data 16 may comprise a database, a large file, data set, logical directory, logical volume, file system, programs, multi-media files, etc.

Figure 2:
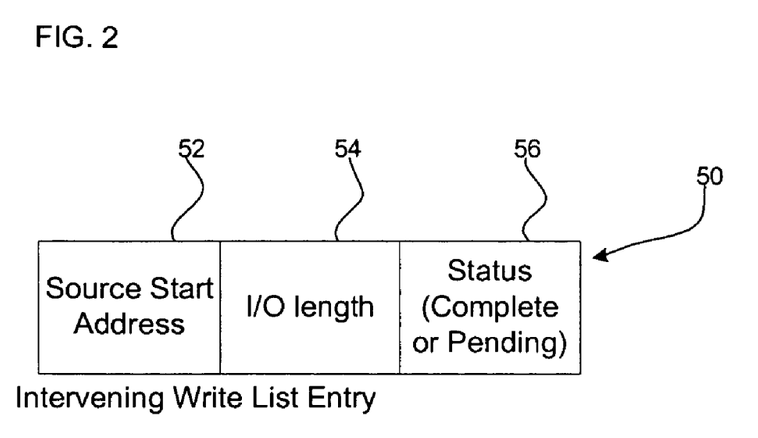
FIG. 2 illustrates information maintained on intervening writes.

An intervening write list 30 includes entries for each write request received from an application 14 to source data 16 units that are being migrated to the target data 20 as part of a data migration operation initiated by the migration manager 12. FIG. 2 illustrates information maintained in an entry 50 in the intervening write list 30 for a write request from the applications 14. The entry 50 includes a source start address 52 indicating the start of the source data 16 to which the write is directed and a byte length 54 of the write, where both the start 52 and length 54 indicate the requested data or units in the source data 16 that are subject to the update. A status field 56 indicates whether the write request is pending or has completed.

Figure 3:
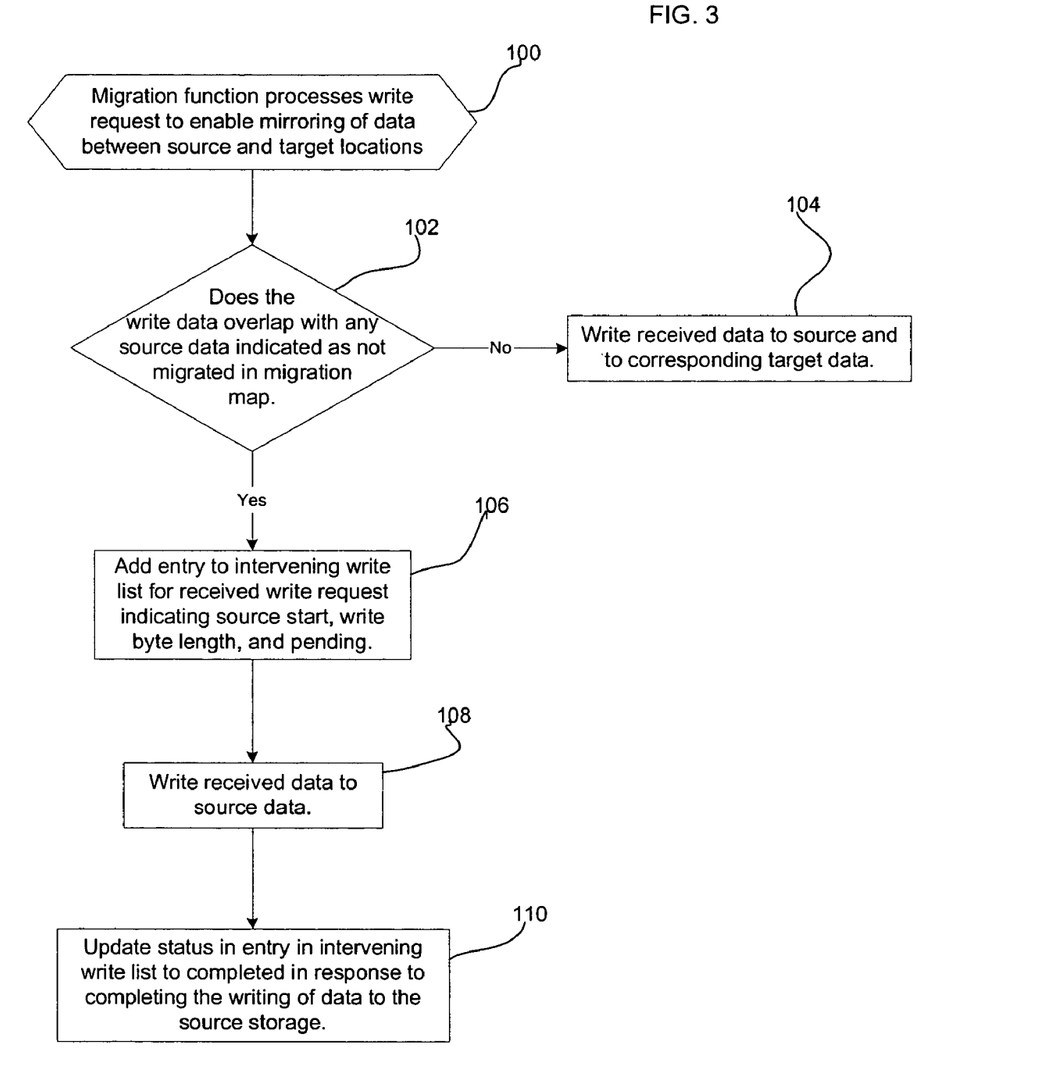
FIG. 3 illustrates operations to process a write request to source data being migrated.

FIG. 3 illustrates operations performed by the file system manager 10 to process a write request to source data 16 subject to migration from one of the applications 14. The operations in FIG. 3 may be performed by the file system manager 10 executing the migration function 24, which is invoked by the file system manager 10 when performing operations with source data subject to a migration mode. Upon receiving (at block 100) a write request to source data 16 from an application 14, if (at block 102) the write data does not overlap with any source data indicated as not migrated in the migration map 28, then the file system manager 10 writes (at block 104) the received data to both the source data 16 and corresponding target data 20. Otherwise if the write data from the application 14 overlaps with source data 16 indicated as not yet migrated in the migration map 28, then the file system manager 10 adds (at block 106) an entry 50 (FIG. 2) to the intervening write list 30 for the received write request indicating the requested source data to write, i.e., the source start 52 and byte length 54 of data to write, and the status 56, which initially is pending. The received data is written (at block 108) to the source data 16 and the status 56 for the entry 50 in the intervening write list 30, i.e., information for the intervening application write request, is set (at block 110) to completed in response to completing the writing of data to the source data 16.

Figure 4:
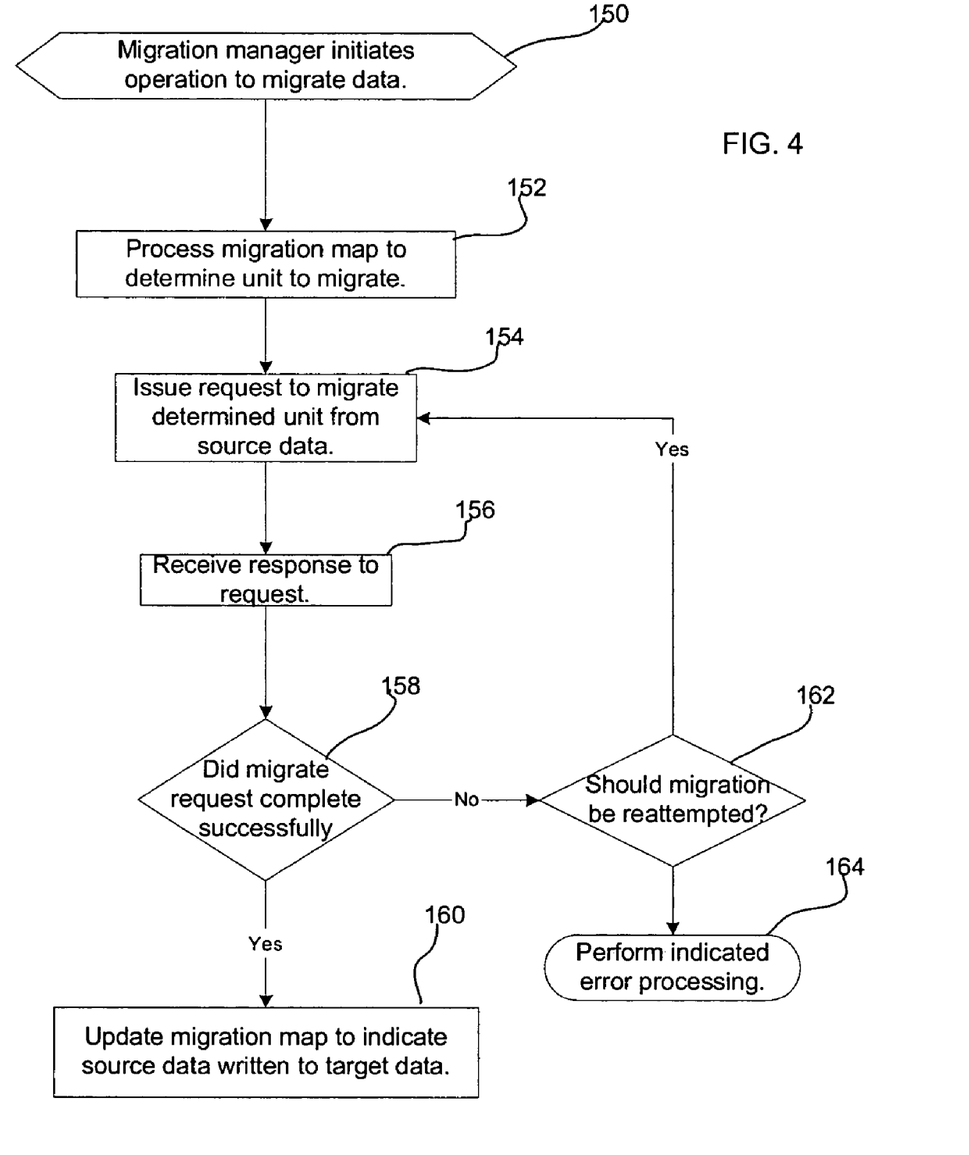
FIG. 4 illustrates an operation to migrate data.

FIG. 4 illustrates operations performed by the migration manager 12 to perform migration operations. Upon initiating (at block 150) an operation to migrate source data to target data, the migration manager 12 processes (at block 152) the migration map 28 to determine one or more units of the source data 16 to migrate to the corresponding target data 20. The migration manager 12 issues (at block 154) a migrate request to cause the file system manager 10 migrate the determined unit from the source data 16 to the corresponding target data 20. Upon receiving the response to the migrate request (at block 156), if (at block 158) the migrate was successful, then the migration manager 12 updates (at block 160) the migration map 28 to indicate that the source data unit was written and successfully migrated to the corresponding target data 20. If the migrate (at block 158) was unsuccessful, then a determination is made (at block 162) whether the migration should be reattempted. If so, control returns to block 154 to reissue the migration request for the source data 16 that did not successfully migrate. Otherwise, if migration is not reattempted, any additional error processing is performed (at block 164).

Figure 5:
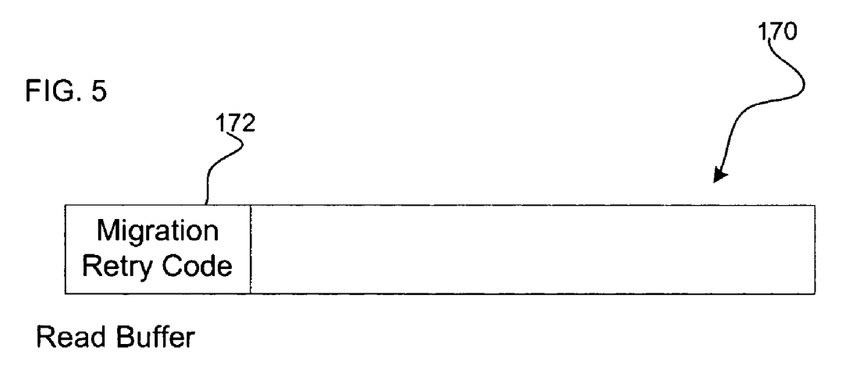
FIG. 5 illustrates a read buffer used when migrating data.

In certain embodiments, the migration manager 12 may initiate the migration operation by submitting a read command and a read buffer, e.g., read buffer 170 in FIG. 5, to the file system manager 10. In submitting the read buffer, the migration manager 12 would submit a pointer to the read buffer 170. The file system manager 10 executes the manager function 24 to process a read from the migration manager 12 as a special migration command to read the requested source data 16 and write the read source data to the corresponding target data 20 at the target storage 22. The migration manager 12 initially may alert the file system manager 10 that certain data or storage is in a migration state via an out-of-band mechanism, such as an IOCTL. The IOCTL may specify an open file descriptor that refers to a device or data subject to migration and the migration function 24 that the file system manager 10 executes to migrate the data when the source storage 18 or source data 16 is addressed in I/O commands.

The manager function 24 may indicate that the migration operation did not complete by returning a response to the read from the migration manager 12 that indicates that the read buffer 170 (FIG. 5) the migration manager 12 supplied does not include all the requested data. To cause the migration manager 12 to retry the migration operation, the migration function 24 may place a migration retry code 172 into the read buffer 170 the migration manager 12 supplied that indicates to the migration manager 12 to retry the migration operation. Thus, the migration function 24 indicates to the migration manager 12 to retry the migration operation by providing a combination of information indicating that not all the requested data was included in the read buffer 170 and including the migration retry code 172 in the read buffer 170. The migration function 24 may supply different error codes in the read buffer 170 by overwriting the location where the migration retry code 172 is located and writing any other recognized error codes into the read buffer 170. Thus, the migration manager 12 upon being informed that the read did not complete, may look for the migration retry code 172 or other error codes to process.

Figure 6:
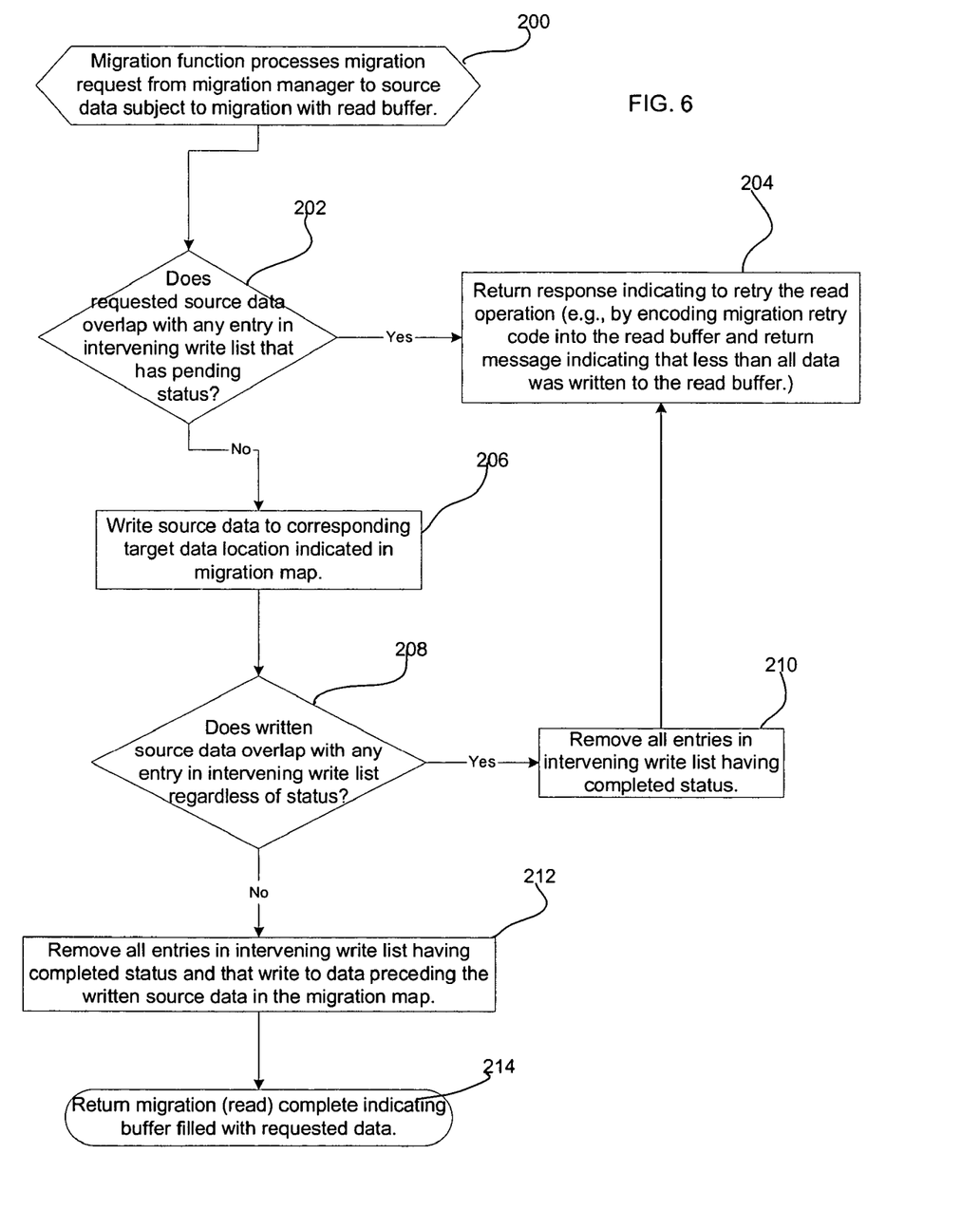
FIG. 6 illustrates operations to process a migration request.

FIG. 6 illustrates operations encoded in the migration function 24 that the file system manager 10 invokes to process a migration request, which may be initiated by a read request from the migration manager 12. This read request may indicate the source data 16 to migrate, as well as the corresponding target data 20 indicated in the migration map 28 of where to write the source data 16. Alternatively, the migration function 24 may process the migration map 28 to determine the corresponding target data 20 of where to migrate indicated source data 16. The migration function 24 processes (at block 200) a migration request from the migration manager 12 to source data 16 subject to migration. In certain embodiments, this request may comprise a read request to source data 16 subject to migration with a read buffer 170. If (at block 202) the requested source data 16 to migrate overlaps with any entry 50 (FIG. 2) in the intervening write list 30 that has pending status 56, then the migration function 24 returns (at block 204) a response indicating to retry the read operation. In certain embodiments, the retry request may be implemented by encoding the migration retry code 172 into the read buffer 170 and return a message indicating that less than all the requested data was written to the read buffer 170. This will ensure that the source data 16 that is migrated is the most current version of that data and that the source data is migrated after any newer application data is applied.

If (at block 202) the source data 16 does not overlap with any data being written to the source data 16 from an application 14, as indicated in the entries 50 in the intervening write list 30, then the source data 16 is written (at block 206) to the corresponding target data 20 location indicated in the migration map 28. If (at block 208) the source data 16 to migrate overlaps with any entry in the intervening write list 30, regardless of status 56 (FIG. 2), i.e., either pending or completed, then the migration is retried because there is a possibility that a pending write request to the migrated source data 16 from an application 14 is pending or completed while the migration was occurring. The migration function 24 or some other process then performs a clean-up operation on the intervening write list 30 by removing (at block 210) all entries in the intervening write list 30 having completed status 56. The migration function 24 proceeds to block 204 to retry the read operation (e.g., by encoding migration retry code into the read buffer and return message indicating that less than all data was written to the read buffer.) The completed entries are removed (at block 210) in response to retrying the read operation because older completed intervening write requests could not cause a conflict or the writing of inconsistent data with respect to the retried migration operation.

If (at block 208) the written source data 16 does not overlap with any write request from an application 14 indicated in the intervening write list 30, then the migration was successful and the migration function 24 (or some other process) removes (at block 212) all entries 50 in the intervening write list 30 having completed status 56 (FIG. 2) and also removes those entries 50 that write to data preceding the written source data in the migration map 28. The migration function 24 then returns (at block 214) complete to the migration request. In embodiments where the migration request was initiated with a read request, the migration function 24 would return a response to the migration manager 12 indicating that the read buffer 170 includes all the requested data.

With the described embodiments, no locks are needed when migrating data, so that writes from the applications 14 or migration operations from the migration manager 12 to source data 16 subject to a migration relationship are allowed to complete without the use of locks or serialization. This avoids delays to both application write requests and migration operations that may occur with the use of locks and serialization. Instead of using locks and serialization, with certain described operations, the migration operation is retried if there is a possibility that an intervening write request from an application 14 could result in a conflict or the migration of inconsistent data.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In certain embodiments, operations were described as performed by components, such as the file system manager 10, migration function 24, and migration manager 12. In alternative embodiments, the described operations may be performed by components other than described or additional components. Further, operations described as performed by components within the kernel space 10 or user space 8 may be performed in a different address space having different priority than described.

The illustrated operations of FIGS. 3, 4, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for migrating source data to target data, comprising:

using, by a migration manager, a map indicating source data to migrate to target data;

receiving write requests to write application data to source data not yet migrated to the target data;

generating information for the write requests indicating the source data to which the application data is written;

writing the application data for the write requests to the source data;

issuing, by the migration manager, migration requests to migrate source data to target data indicated in the map as not yet migrated;

receiving, by a migration function, a migration request from the migration manager to migrate source data indicated in the map as not yet migrated to target data as part of a migration operation to mirror source data to target data;

returning, by the migration function, indication to retry the migration request to the migration manager in response to the migration request and in response to determining that the requested source data to migrate as part of the migration request overlaps source data indicated in the generated information for one of the write requests; and returning, by the migration function, indication to retry the migration request to migrate to the migration manager in response to migrating the source data to the target data for the migration request and in response to determining that the migrated source data overlaps source data indicated in the generated information for one of the write requests.

2. The method of claim 1, wherein the write requests to write application data are from an application.

3. The method of claim 2, wherein the application and the migration program execute in a user address space and wherein the migration function executes in a kernel address space.

4. The method of claim 1, wherein the generated information for the write requests indicates a status of the write of the application data as pending or completed, wherein the indication to retry is returned before the source data to migrate is transferred to the target data and in response to determining that the requested source data to migrate overlaps source data indicated in generated information for one of the write requests having pending status.

5. The method of claim 1, wherein the generated information for write requests indicates a status of the write requests as pending or completed, wherein the indication to retry is returned after the source data to migrate is transferred to the target data and in response to determining that the requested source data to migrate overlaps source data indicated in generated information for one of the write requests having pending or completed status.

6. The method of claim 5, further comprising:
    setting the status in the generated information for the write requests to completed in response to writing the application data for the write request to the source data indicated in the generated information for the write request.

7. The method of claim 1, wherein the indication to retry is returned in response to determining that the requested source data to migrate overlaps source data indicated in generated information for one of the write requests both before transferring the source data to migrate to the target data and after transferring the source data to migrate to the target data.

8. The method of claim 1, wherein the generated information indicates a status of the write request as pending or completed, further comprising:
    removing generated information for write requests having completed status in response to migrating source data to target data.

9. The method of claim 8, further comprising:
    removing generated information for write requests to source data preceding the source data to migrate in response to writing the source data to the target data.

10. The method of claim 1, wherein returning indication to retry the request to migrate comprises:
    indicating in the response to the request to migrate that the request did not complete; and
    including in the response a retry code indicating to retry the request to migrate.

11. The method of claim 10, wherein the request to migrate from the migration manager comprises a read request and a read buffer, and wherein indicating in the response that the request to migrate did not complete comprises indicating that all the requested data is not included in the read buffer, and wherein the retry code is included at a predetermined position in the read buffer returned in response to the read request.

12. A system for migrating source data to target data, comprising:
    a source storage location;
    a target storage location;
    a memory; and
    circuitry that communicates with the source and target storage locations and the memory, wherein the circuitry implements a migration manager and performs operations, the operations comprising:
        using, by the migration manager, a map indicating source data to migrate to target data;
        receiving write requests to write application data to source data not yet migrated to the target data;
        generating information for the write requests indicating the source data to which the application data is written;
        writing the application data for the write requests to the source data;
        issuing, by the migration manager, migration requests to migrate source data to target data indicated in the map as not yet migrated;
        receiving, by a migration function, a migration request from the migration manager to migrate source data indicated in the map as not yet migrated to target data as part of a migration operation to mirror source data to target data;
        returning, by the migration function, indication to retry the migration request to the migration manager in response to the migration request and in response to determining that the requested source data to migrate as part of the migration request overlaps source data indicated in the generated information for one of the write requests; and
        returning, by the migration function, indication to retry the migration request to migrate to the migration manager in response to migrating the source data to the target data for the migration request and in response to determining that the migrated source data overlaps source data indicated in the generated information for one of the write requests.

13. The system of claim 12, wherein the write requests to write application data are from an application.

14. The system of claim 13, wherein the application and the migration program execute in a user address space and wherein the migration function executes in a kernel address space.

15. The system of claim 12, wherein the generated information for the write requests indicates a status of the write of the application data as pending or completed, wherein the indication to retry is returned before the source data to migrate is transferred to the target data and in response to determining that the requested source data to migrate overlaps source data indicated in generated information for one of the write requests having pending status.

16. The system of claim 12, wherein the generated information for write requests indicates a status of the write requests as pending or completed, wherein the indication to retry is returned after the source data to migrate is transferred to the target data and in response to determining that the requested source data to migrate overlaps source data indicated in generated information for one of the write requests having pending or completed status.

17. The system of claim 16, wherein the operations further comprise:
    setting the status in the generated information for the write requests to completed in response to writing the application data for the write request to the source data indicated in the generated information for the write request.

18. The system of claim 12, wherein the indication to retry is returned in response to determining that the requested source data to migrate overlaps source data indicated in generated information for one of the write requests both before transferring the source data to migrate to the target data and after transferring the source data to migrate to the target data.

19. The system of claim 12, wherein the generated information indicates a status of the write request as pending or completed, wherein the operations further comprise:
    removing generated information for write requests having completed status in response to migrating source data to target data.

20. The system of claim 19, wherein the operations further comprise:
    removing generated information for write requests to source data preceding the source data to migrate in response to writing the source data to migrate to the target data.

21. The system of claim 12, wherein returning indication to retry the request to migrate comprises:
    indicating in the response to the request to migrate that the request did not complete; and
    including in the response a retry code indicating to retry the request to migrate.

22. The system of claim 21, wherein the request to migrate from the migration manager comprises a read request and a read buffer, and wherein indicating in the response that the request to migrate did not complete comprises indicating that all the requested data is not included in the read buffer, and wherein the retry code is included at a predetermined position in the read buffer returned in response to the read request.

23. An article of manufacture comprising at least one of a hardware device including hardware logic and computer readable storage including code operable for performing operations to migrate source data to target data, wherein the code includes a migration manager and causes operations to be performed, the operations comprising:
    using, by the migration manager, a map indicating source data to migrate to target data;
    receiving write requests to write application data to source data not yet migrated to the target data;
    generating information for the write requests indicating the source data to which the application data is written;
    writing the application data for the write requests to the source data;
    issuing, by the migration manager, migration requests to migrate source data to target data indicated in the map as not yet migrated;
    receiving, by a migration function, a migration request from the migration manager to migrate source data indicated in the map as not yet migrated to target data as part of a migration operation to mirror source data to target data;
    returning, by the migration function, indication to retry the migration request to the migration manager in response to the migration request and in response to determining that the requested source data to migrate as part of the migration request overlaps source data indicated in the generated information for one of the write requests; and
    returning, by the migration function, indication to retry the migration request to migrate to the migration manager in response to migrating the source data to the target data for the migration request and in response to determining that the migrated source data overlaps source data indicated in the generated information for one of the write requests.

24. The article of manufacture of claim 23, wherein the write requests to write application data are from an application.

25. The article of manufacture of claim 24, wherein the application and the migration program execute in a user address space and wherein the migration function executes in a kernel address space.

26. The article of manufacture of claim 23, wherein the generated information for the write requests indicates a status of the write of the application data as pending or completed, wherein the indication to retry is returned before the source data to migrate is transferred to the target data and in response to determining that the requested source data to migrate overlaps source data indicated in generated information for one of the write requests having pending status.

27. The article of manufacture of claim 23, wherein the generated information for write requests indicates a status of the write requests as pending or completed, wherein the indication to retry is returned after the source data to migrate is transferred to the target data and in response to determining that the requested source data to migrate overlaps source data indicated in generated information for one of the write requests having pending or completed status.

28. The article of manufacture of claim 27, wherein the operations further comprise:
    setting the status in the generated information for the write requests to completed in response to writing the application data for the write request to the source data indicated in the generated information for the write request.

29. The article of manufacture of claim 23, wherein the indication to retry is returned in response to determining that the requested source data to migrate overlaps source data indicated in generated information for one of the write requests both before transferring the source data to migrate to the target data and after transferring the source data to migrate to the target data.

30. The article of manufacture of claim 23, wherein the generated information indicates a status of the write request as pending or completed, wherein the operations further comprise:
    removing generated information for write requests having completed status in response to migrating source data to target data.

31. The article of manufacture of claim 30, wherein the operations further comprise:
    removing generated information for write requests to source data preceding the source data to migrate in response to writing the source data to migrate to the target data.

32. The article of manufacture of claim 23, wherein returning indication to retry the request to migrate comprises:
    indicating in the response to the request to migrate that the request did not complete; and
    including in the response a retry code indicating to retry the request to migrate.

33. The article of manufacture of claim 32, wherein the request to migrate from the migration manager comprises a read and a read buffer, and wherein indicating in the response that the request to migrate did not complete comprises indicating that all the requested data is not included in the read buffer, and wherein the retry code is included at a predetermined position in the read buffer returned in response to the read request.

* * * * *

UNITED STATES PATENT AND TRADEMARK OFFICE
CERTIFICATE OF CORRECTION

PATENT NO. : 7,613,889 B2
APPLICATION NO. : 10/865625
DATED : November 3, 2009
INVENTOR(S) : Stakutis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 338 days.

Signed and Sealed this

Fourteenth Day of December, 2010

David J. Kappos
*Director of the United States Patent and Trademark Office*